US008027838B2

(12) United States Patent
Sang et al.

(10) Patent No.: US 8,027,838 B2
(45) Date of Patent: Sep. 27, 2011

(54) METHOD AND SYSTEM FOR CONNECTING CHARACTERS, WORDS AND SIGNS TO A TELECOMMUNICATION NUMBER

(75) Inventors: Junsheng Edward Sang, Shanghai (CN); Yuanzhe Xie, Shanghai (CN)

(73) Assignee: Sheng Zhan Information Technology (Shanghai) Ltd., Shanghai (CN)

( * ) Notice: Subject to any disclaimer, the term of this patent is extended or adjusted under 35 U.S.C. 154(b) by 902 days.

(21) Appl. No.: 10/595,532

(22) PCT Filed: Oct. 22, 2004

(86) PCT No.: PCT/CN2004/001204
§ 371 (c)(1),
(2), (4) Date: Feb. 8, 2008

(87) PCT Pub. No.: WO2005/043781
PCT Pub. Date: May 12, 2005

(65) Prior Publication Data
US 2009/0018817 A1    Jan. 15, 2009

(30) Foreign Application Priority Data
Oct. 28, 2003    (CN) .......................... 2003 1 0108229

(51) Int. Cl.
*G10L 15/00* (2006.01)
(52) U.S. Cl. ..... 704/270; 455/414.5; 455/41; 379/88.14
(58) Field of Classification Search .................. 704/270; 455/414.5, 41; 379/88.14
See application file for complete search history.

(56) References Cited

U.S. PATENT DOCUMENTS

| | | | | |
|---|---|---|---|---|
| 2002/0126708 A1* | 9/2002 | Skog et al. | ..................... | 370/522 |
| 2004/0006538 A1* | 1/2004 | Steinberg et al. | ............... | 705/39 |
| 2004/0014454 A1* | 1/2004 | Burgess et al. | ............... | 455/405 |
| 2007/0162412 A1* | 7/2007 | Percy | .............................. | 707/1 |
| 2009/0019061 A1* | 1/2009 | Scannell, Jr. | .................... | 707/10 |

FOREIGN PATENT DOCUMENTS

CN    1295422 A    5/2001
(Continued)

*Primary Examiner* — Daniel D Abebe
(74) *Attorney, Agent, or Firm* — Kenyon & Kenyon LLP

(57) ABSTRACT

This invention relates to the field of wireless data and instant communication technologies and describes a method and a system for connecting words, phrases, or symbols of any languages or multimedia expressions, within the content of transmitted data, to telecommunication codes. The presented method of the invention selects a group of Telecom Codes, defines Content Names, assigns the Content Names to the Telecom Codes, receives the transmitted content, and redirects the content to the connected Telecom Codes after detecting the existence of the Content Names. The presented system of the invention combines both software and hardware functions, with the hardware portion comprising a Processor, a Memory, a Display Device, an input Device, and a Communication Interface, and the software portion comprising an Operating System, a Client Data Management Module including Management Interface, a Database Software, a group of Telecom Codes as well as other connectable Telecom Codes configured in the Database Software, a group of defined Content Names configured in the Database Software, the Connection Relations and the Rules of Directing configured in the Database Software, an Analysis and Redirecting Module, and a Communication Interface. The presented method and system, of the invention solves the difficulties in memorizing and input cumbersomeness when long Telecom Codes of many digits are used, and leads to five new application developments; Information Portal, Multiple Content Names Connecting to Single Telecom Code, Multiple Telecom Codes Connecting to Single Content Name, Connection of Classified Advertisements, and Interactive Customer Relation Management (ICRM) and Supplier Relation Management (ISRM) System.

15 Claims, 4 Drawing Sheets

FOREIGN PATENT DOCUMENTS

| | | |
|---|---|---|
| CN | 1407823 A | 4/2003 |
| WO | WO 9732439 A2 | 9/1997 |
| WO | WO 9811744 A1 | 3/1998 |
| WO | WO 03019959 A1 | 3/2003 |

* cited by examiner

METHOD AND SYSTEM FOR CONNECTING CHARACTERS, WORDS AND SIGNS TO A TELECOMMUNICATION NUMBER

FIELD OF THE INVENTION

This invention relates to data communication technologies and the associated system configurations of hardware and software components; in particular, it closely relates to wireless data and instant communication technologies. This invention describes a method and a system for connecting words, phrases, or symbols of any languages or multimedia expressions, within the content of transmitted data, to telecommunication codes.

BACKGROUND OF THE INVENTION

The data communication technologies currently transmit the data content inputted by the end users to the receiving terminal equipment, such as mobile or cell phones, computers, or cordless phones, which are identified by their telecom codes (numbers) and are specified by the end users at the time of transmission. Both end users sending instant messages and cell phone users sending Short Message Service (SMS) contents can dial a specific SMS Short Code provided by a Mobile Telecom Carrier or dial the intended cell, phone number directly. SMS Short Codes are provided by Mobile Telecom Carriers to Service Providers and the Service Providers use these SMS Short Codes to offer value-added data services to the end users. An SMS Short Code provided by the Mobile Telecom Carriers usually comprises four digits, such as 1188. Following these four digits of each Short Code, any additional digits of any Arabic numbers up to a maximum of 15 digits can be added by the Service Providers to extend it to a Sub Short Code. By this means, a Service Provider can generate many non-repeated and unique Sub Short Codes that can be assigned to the end users or used for any type of information services. Once a specific Sub Short Code is assigned to a specific end user, arty other users can send instant message contents or SMS contents to the specific end user via dialing the assigned Sub Short Code. When sending instant messages or SMS contents by this means, a sender needs to key in the complete digits of a Sub Short Code up to a maximum of 19 digits, such as 1188181297561925793. Such a long code is very difficult to remember, and keying in turns out to he cumbersome and inefficient. More importantly, the sole purpose of the Sub Short Codes with long digits of numbers is to serve as assigned telecommunication codes.

DESCRIPTION OF THE INVENTION

The purpose of this invention is to develop a method for connecting words, phrases, or symbols of any languages or multimedia expressions, within the content of the transmitted data, to telecommunication codes, and a content-name-to-code connection system based on the method. This method and system eliminate difficulty in memorizing and input cumbersomeness originated from many digits of a Sub Short Code, and also lead to five new application developments based on the method and system: Information Portal, Multiple Content Names Connecting to a Single Sub Short Code, Multiple Sub Short Codes Connecting to a Single Content Name, Connection of Classified Advertisements, and Interactive Customer Relation Management (ICRM) and Supplier Relation Management (ISRM) System.

This invention includes the following steps:

a). Select a group of Sub Short Codes, each of which is characterized with the first part as a directly dialed Short Code and the second part as a Sub Code. A Sub Code is the extra digits of Arabic numbers following the original Short Code. Each Sub Code is non-ambiguous and unique within the selected group, but can be the same as the ones from other groups of Sub Short Codes or be connected to them. The selected group of Sub Short Codes is configured in a database. Any digits of Sub Short Codes in the selected group or any other groups are any characters permitted by telecom network systems.

b). Define a unique format or form of any selected, word(s), phrase(s), or symbol(s) in any languages, or of any multimedia expressions, or of any combination of the above, as a Content Name. Each of such unique Content Names can be located in any place within the transmitted data. All the defined Content Names are configured in a database.

c). Assign one specific or a specific group of Content Names to one specific or a specific group of Sub Short Codes. Between them the connection relations and the rules of directing are characterized as valid and executable, but are not necessarily on a one-to-one basis. Each of the connection relations and the rules of directing is configured in the database.

d). Design a set of logic structures and computing programs to manage the Sub Short Codes, Content Names, and connecting/directing functions, to receive and analyze the transmitted content, to detect the occurrence of any specific Content Name, and to redirect the transmitted content to the corresponding Sub Short Code.

e). Set up a system, combining both software and hardware portions, which can independently accomplish the functions of connecting words, phrases, or symbols of any languages or multimedia expressions, within the content of the transmitted data, to the Sub Short Codes. The hardware portion of this system comprises a Processor, a Memory, a Display Device, an Input Device, and a Communication Interface, and the software portion of the system comprises an Operating System, a Client Data Management Module including the Management Interface, a Database Software, a group of Sub Short Codes as well as other connectable Telecom Codes configured in the Database Software, a group of defined Content Names configured in the Database Software, the Connecting Relation and the Rule of Directing configured in the Database Software, an Analysis and Redirecting Module, and a Communication Interface.

f). Complete testing the system configuration for the Content Names connecting to the Sub Short Code as well as the system interface with the telecom networks.

Description of the five application developments based on this invention;

1. Information Portal

An Information Portal in SMS or Multimedia Message Service (MMS) for all users of any languages can be built based on the presented method and system described in the invention. An end user only needs to remember and dial a Sub SMS Short Code 118818, as an example, and then key in a defined Content Name such as "Hospitals" in SMS, before sending it out. As a result, messages containing the sought information will be returned and received by the user, which is enabled by the invention. If desired, further messages from the user can be directed to any corresponding Sub Short Codes or cell phone numbers. In the example above, a user writes a SMS "Hospitals" on his/her cell phone, and then sends the SMS to 118818. The system based on the invention sends back a menu list of all registered hospitals in a responding SMS. The user's SMS responding to any single selection on the menu list is routed to the Hospital's SMS processing computer software or the designated person's cell phone on duty. Such a SMS or MMS Information Portal offers a vast amount of information on many subjects, such, as News, Financial Services (Banking and Stock Markets), Weather, Travel, Hotels, Restaurants, Insurance, Healthcare, Fashion, Entertainment, etc., A key aspect of the presented method and system, based on the invention is direct connection to the parties of information sources via SMS/MMS terminals or cell phones for interactive communications.

2. Single Code Connecting to Multiple Content Names

Multiple Content Names can be connected to a single Sub Short Code or Cell Phone Number, based on the invented method and system. Therefore, a single individual or a single company can register the Content Names in Chinese, English, Japanese, Korean, or Nick Names, or any chosen names. As long as a Content. Name is unique and not yet assigned for connection in the invented, system, it can be connected to a single Code. An end user keys in any one of the assigned Content Names and sends it to a SMS Short Code such as 118818, and then the end user will be able to communicate with the individual or the company with the connected Content Names, During communications in SMS, the party with multiple Content Names can use any one of them individually.

3. Single Content Name Connecting to Multiple Codes

Multiple Sub Short Codes or Cell Phone Numbers can be connected to a single Content Name based on the presented method and system of the invention. For example, a user keys in a Content Name such as "Stock Trading" or "Dating" on his/her cell phone, and sends the SMS to a SMS Short Code 118818, As a result, his/her cell phone number is now connected to the Content Name and the user can join the discussion group or the chat group. All the cell phones or SMS/MMS receiving terminals connected to the same Content Name will be able to receive all the exchanging messages in SMS or MMS.

4. Connection of Classified Advertisements

A central system of classified advertisements with direct input/retrieval functions is developed based on the presented method and system, of the invention. Advertisers send advertisement contents in SMS to a SMS Short Code such as 118818, using a connected Content Name such as "Room for Rent", while renters retrieve the classified advertisements by sending a SMS request to a SMS Short Code such as 118818 with a connected Content Name "Renting". A key aspect of the presented method and system based on fee invention is direct connection from the renters to the advertisers via SMS/MMS terminals or cell phones for interactive communications.

5. Interactive Customer Relation Management (ICRM) and Supplier Relation Management (ISRM) System An Interactive Customer Relationship Management (ICRM) and interactive Supplier Relationship Management (ISRM) System is developed based on the presented method and system of the invention. ICRM/ISRM System allows corporate employees to discuss and to communicate business with customers or suppliers from anywhere at any time. The contents of the discussions and communications are documented automatically and can be retrieved immediately in the ICRM/ISRM system.

DESCRIPTION OF THE PREFERRED EMBODIMENTS

Figure 1:
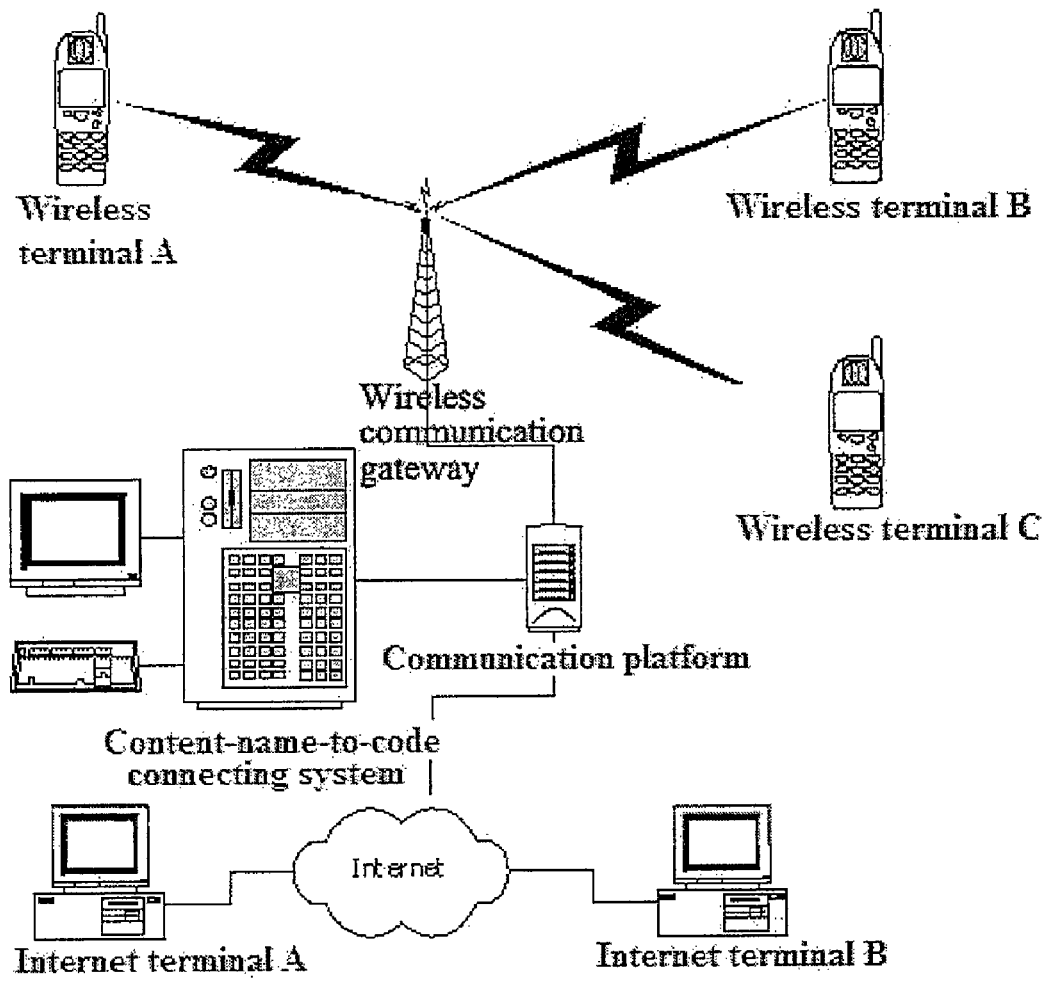
FIG. 1 is a block diagram of the invented system in the overall structure of wireless and instant communication, network.

The presented invention relates to the field of wireless data and instant communication technologies. FIG. 1 is a block diagram of the invented system in the overall structure of a wireless and instant communication network. The preferred architecture, comprising all hardware components and necessary software programs, can be divided into five portions: Wireless Terminals, a Wireless Communication Gateway, a Communication. Platform, Internet Terminals, and the presented system (Content-Name-to-Code connection System). Wireless Terminals are cell phones (or mobile devices) used by the end users, which must be registered with wireless networks, such as those of China Mobile or China Unicom, must be in either GSM mode or CDMA mode, and must support SMS technologies. A Wireless Communication Gateway is a server for sending/receiving/routing SMS set up by the Mobile Telecom Carriers. While its detailed system implementation is not restricted, it must provide a technical interface for the SMS Service Providers to connect to their systems. A Communication Platform is a server for sending/receiving/routing SMS set up by the SMS Service Providers, which connects to the Wireless Communication Gateways of the Mobile Telecom Carriers either directly or through a secondary Wireless Communication Gateway set up by another SMS Service Provider that is one level up. A Communication Platform also connects to the Internet terminals at the same time. Instant communications occur between Internet Terminals, while wireless communications in SMS or MMS occur between Wireless Terminals or between Wireless Terminals and Internet Terminals. The invented system connects to a Communication Platform first, through which the connections between Wireless Terminals, between Wireless Terminals and Internet Terminals, and between Internet Terminals are established. Then the functions of the invented system and its new application developments are executed.

Figure 2:
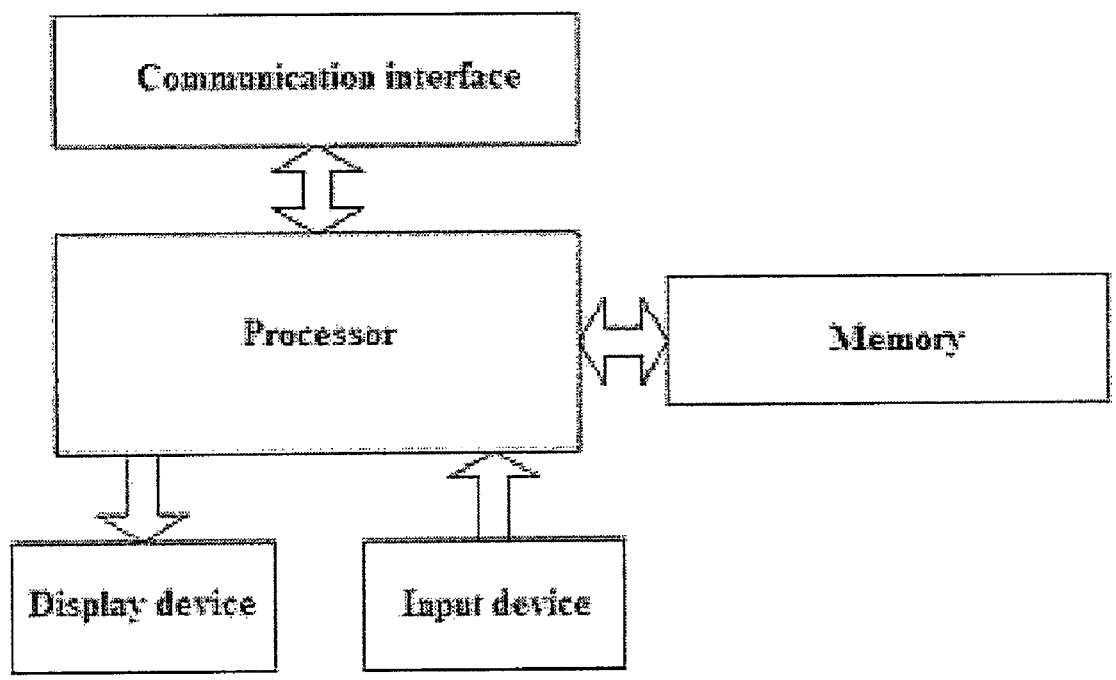
FIG. 2 is a block diagram of configuration of the hardware modules in the invented system.
Figure 3:
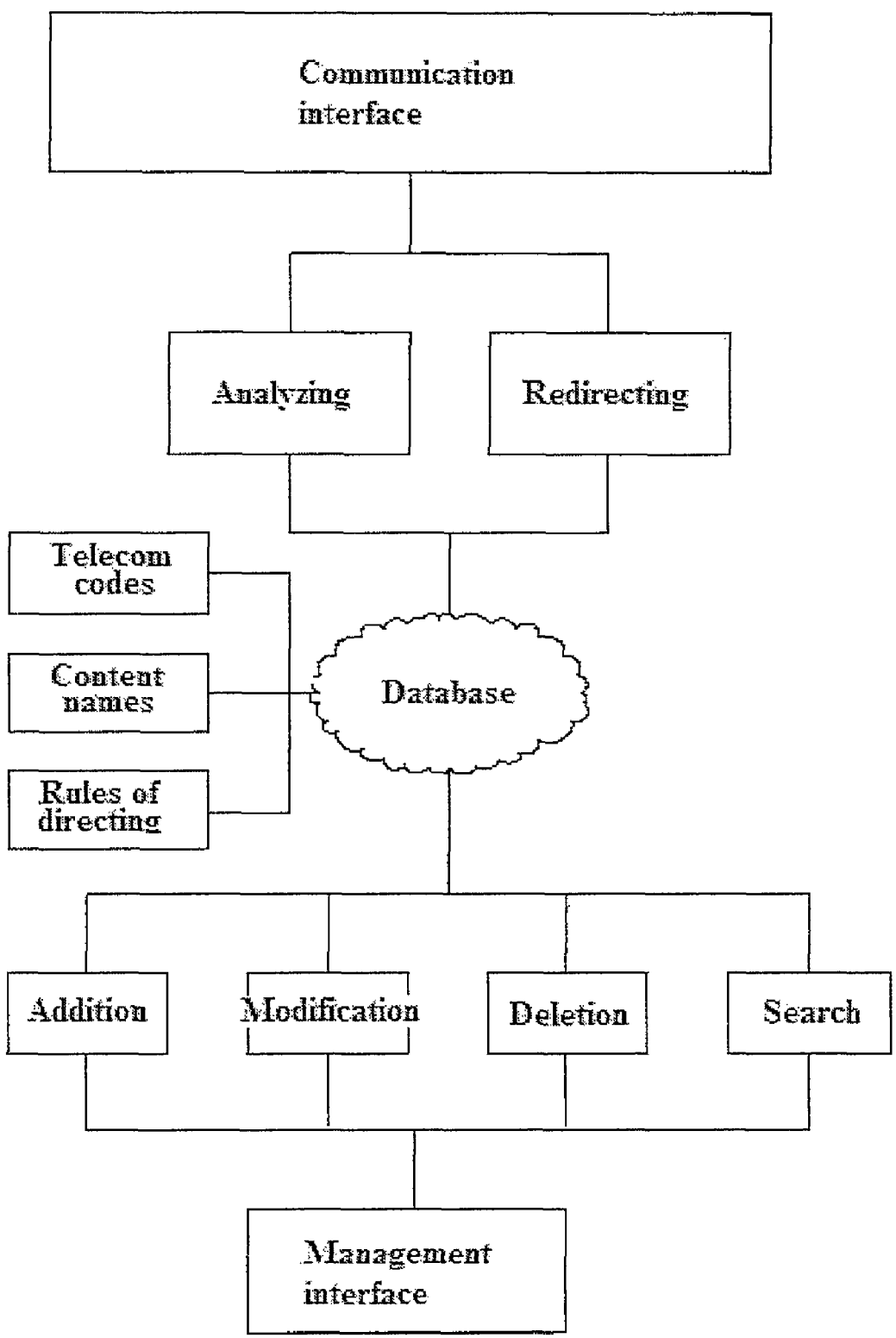
FIG. 3 is a block diagram of the configuration of the software functional modules in the invented system.

The invented system comprises a hardware portion and a software portion, and only the combination of both as a whole is capable of executing the functions of connecting words, phrases, or symbols of any languages or multimedia expressions, within the content of the transmitted data, to telecommunication codes. FIG. 2 is a block diagram of the preferred configuration of the hardware modules in the invented system. The hardware portion comprises a Processor, a Memory, a. Display Device, an Input Device, and a Communication Interface, which are of the prior arts and can he purchased hi the open market. The computers of prior arts configured, as above may meet the hardware requirements of the invented system, although they may not be the best fit. FIG. 3 is a block diagram of preferred software junctional, modules of the invented system. Such a software portion comprises an Operating System., a Client Data Management Module including a Management Interface, a Database Software, a group of Sub Short Codes as well as other connectable Telecom Codes configured in the Database Software, a group of defined Content Names configured in the Database Software, the Connection Relations and the Rules of Directing configured in the Database Software, an Analysis and Redirecting Module, and a Communication Interface. The preferred software programs comprise the Operating System of prior arts, the Database Software of the prior arts, and all other self-developed application software programs. A Client Data Management Module provides client service and searches the registered data of the clients, and the Module includes Sub Modules functioning for data addition, data deletion, data revision and data search. The connection between the Content Names to the Telecom Codes must be executable, but is not necessarily on a one-to-one basis. The Analysis and Redirecting Module is the core module of the invented system as it is responsible for receiving and processing the transmitted content from the Communication Platform and the Wireless Communication Gateway, detecting the Content Names within the transmitted content, searching the data materials configured in the database and the rules of assigning connections, and thus resolving the destination Telecom Codes, and finally redirecting the transmitted content to the Internet or Wireless Terminals associated with the connected Telecom Codes via the Communication Platform.

Figure 4:
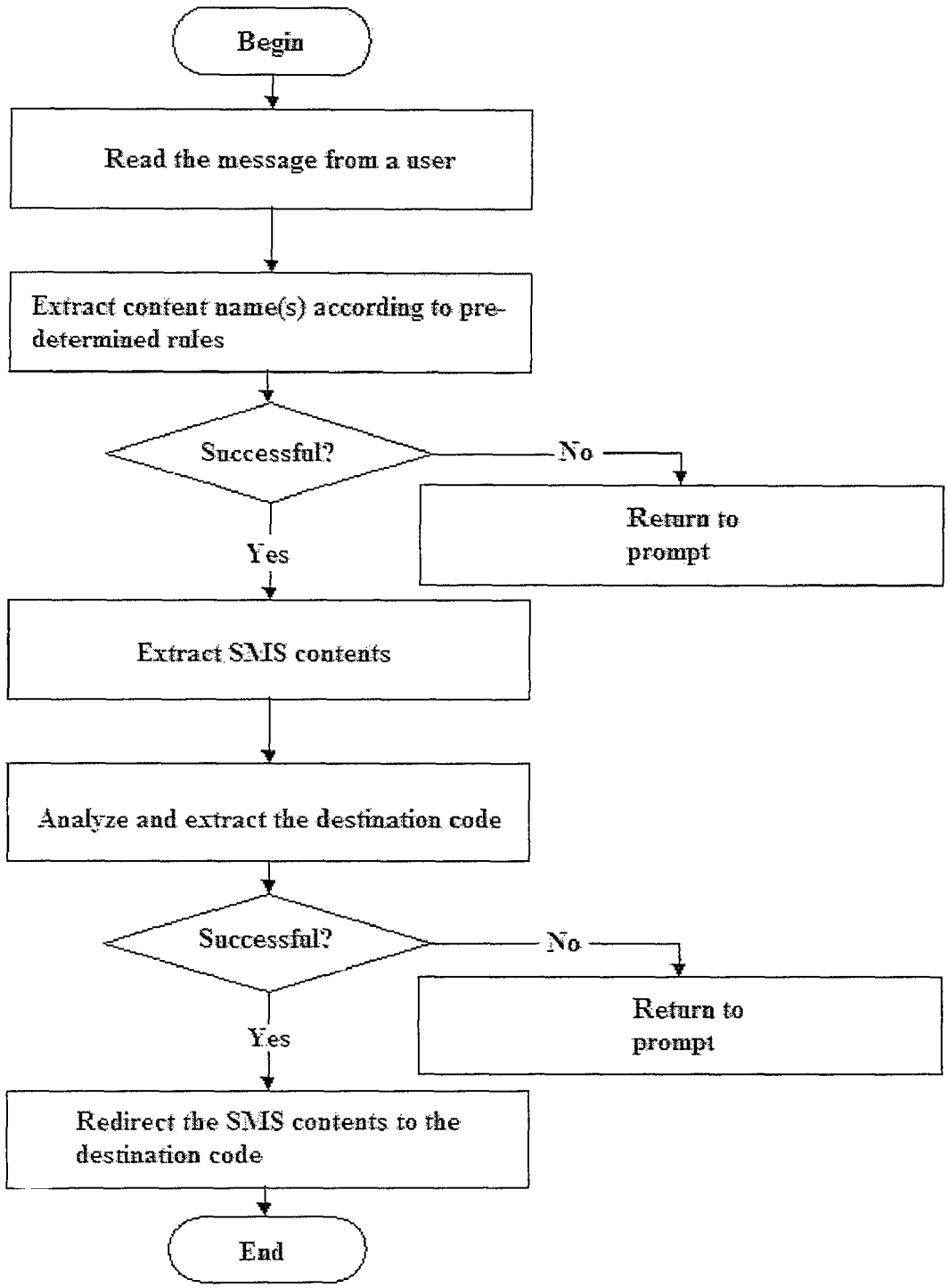
FIG. 4 is a flow diagram depicting a preferred process implemented by the presented system.

FIG. 4 is a flow diagram depicting a preferred process implemented by the invented system, which demonstrates a preferred embodiment of a working process and working principles of the invented method. At first, a client such as a corporation needs to register in the invented system with, a corporation name "Shanghai Shuangai Information Technology Co. Ltd", as an example. The corporation expects that its customers can easily remember the corporation's abbreviated name "Shanghai Shuangai." Therefore, using the short abbreviation as the Content Name, the corporation registers "Shanghai Shuangai" in order for it to connect to the cell phone number "13917481318" or Sub Short Code "11881853061118". A system .administrator of the presented system is responsible for checking and confirming the accuracy of the registered data. When a cell phone user has a question to consult "Shanghai Shuangai Information Technology Co. Ltd", but has no contact information available, he/she can write the short abbreviated name or the Content Name "Shanghai Shuangai" and any additional SMS content, and then send it to a SMS Short Code "18818". By this means, the cell phone user does not need, to know and to key in the contact telephone numbers of the corporation "Shanghai Shuangai Information Technology Co. Ltd". One example of a defined format is to use colon to separate the Content Name from other content. When a customer needs to know the street address of this corporation, he/she just needs to write a SMS such as "Shanghai Shuangai: what is your corporation's street address?" and send it to a SMS Short Code "118818". After the SMS reaches the corresponding Mobile Telecom Carrier, it passes the Wireless Communication Gateway and arrives at the Communication Platform of the SMS Service Provider, and then is received by the presented system of the invention and processed by the Analysis and Redirecting Module. The Module activates to analyze the validity of the SMS. When the Module fails to detect the right format, it responds by sending an error message, such as "your input format is wrong", to the origin cell phone user. When the format is correct, the Module checks the Content Name and the following SMS content. As in the example above, "Shanghai Shuangai" is a Content Name, and "what is your corporation's street address?" is the following SMS content. After detecting the registered Content Name successfully, the presented system of the invention searches the connected Telecom Codes based on the rules of connection. When the rule is a precise connection to the assigned codes, the search result based on the registered data reveals the connected cell phone number "13917481318" or Sub Short Code "11881853061118", and then the following SMS content "what is your corporation's street address?" is redirected to the cell phone "13917481318" or the connected Sub Short Code "11881853061118". If the corporation has never registered in the presented system of the invention, or the customer inputs a wrong Content Name, the process of connecting will fail and the presented system will respond by sending an error message, such as "there is a problem with your input name", to the origin cell phone user. When the corporation receives the SMS content "what is your corporation's street address?", it can reply manually or process through an automated software to produce a reply SMS, such as "our corporation is located at 477 Madang Road". The reply SMS then passes the Communication Platform of the SMS Service Provider and the Wireless Communication Gateway of the Mobile Telecom Carriers, and then reaches the origin end user's cell phone. In this case, the user's cell phone displays the reply SMS showing "our corporation is located at 477 Madang Road" from "Shanghai Shuangai. Information Technology Co. Ltd". In addition, the reply SMS is, connected, to the Telecom Code assigned to "Shanghai Shuangai Information Technology Co. Ltd", so the origin cell phone user just needs to reply again in SMS to continue the communication. During the entire process, there is no need for the origin cell phone user to know/search/memorize the phone numbers or the Telecom Codes of the other party. As such, the presented method and system of the invention have solved the problems associated with long codes with many digits of numbers, which are very difficult to remember and cumbersome and inefficient to key in, and have developed new applications based on the invention.

The invention claimed is:

1. A method for connecting words, phrases, or symbols within the content of a transmitted data to telecommunication codes, comprising:
   selecting a group of Telecom Codes configured within at least one database, each of which comprises a first part as a Head Code and a second part as a Sub Code;
   defining a unique format or form of at least one word, phrase, or symbol in a plurality of natural languages as at least one Content Name;
   assigning said at least one of Content Name to at least one Telecom Code through one or more connection relations and rules of directing within said at least one database;
   analyzing the transmitted data in accordance with the defined unique format or form; and
   redirecting said transmitted data to said at least one Telecom Code upon said, analyzing step.

2. The method of claim 1, wherein the at least one Telecom Code comprises at least one of a Short Message Service (SMS) Short Code provided by Mobile Telecom Carriers, and Sub Short Code, wherein Sub Short Codes are extensions of SMS Short Code with the SMS Short Code as the Head Code and any additional digits of any Arabic numbers up to a maximum of 15 digits as the Sub Code.

3. The method of claim 1, wherein the Sub Code and Telecom Codes comprise at least one of any cell phone numbers and the same set of Arabic numbers assigned to other hardware terminals for end users.

4. The method of claim 1, wherein the contents of transmitted data comprise at least one of SMS contents in wireless communications and instant message (IM) contents in instant communications.

5. The method of claim 1, wherein the plurality of natural languages comprises one or more of Chinese, English, French, German, Russian, Spanish, Japanese, Korean, Thai, Vietnamese, Indian, Turkey, and Arabic.

6. The method of claim 1, wherein assignment of Content Names connecting to Telecom Codes comprising at least one of: a specific Content Name connecting to a specific Telecom Code, a specific Content Name connecting to multiple Telecom Codes, and multiple Content Names connecting to a specific Telecom Code.

7. A method for connecting words, phrases, or symbols within the content of a transmitted data to telecommunication codes, comprising:
   assigning at least one of Content Name to at least one Telecom Code through one or more connection relations and rules of directing;
   detecting said at least, one Content Name and a SMS content within the transmitted data;
   extracting said at least one Content Name and the SMS content in accordance to said one or more connection relations and rules of directing;
   searching one or more databases for at least one corresponding Telecom Code associated with the Content Name; and
   redirecting the SMS content to one or more terminals associated with the Telecom Codes.

8. The method of claim 7, further comprising determining the validity of the format of the transmitted data upon said extracting step.

9. The method of claim 7, wherein the defined Content Name comprises unique formats or unique forms of any selected word, phrase, or symbol in any natural language, or any combination of the above.

10. The method of claim 9, wherein the natural languages comprises one or more of Chinese, English, French, German, Russian, Spanish, Japanese, Korean, Thai, Vietnamese, Indian, Turkey, and Arabic.

11. A method for connecting words, phrases, or symbols within the content of a transmitted data to telecommunication codes, comprising:
   selecting a group of Telecom Codes, each of which is characterized with a first part as a directly dialed Head Code and a second part as a Sub Code that contains extra digits of Arabic numbers following an original Head Code, wherein each Sub Code within the selected group Telecom Codes is at least one of non-ambiguous, unique, or same set of numbers as numbers from other groups of Sub Codes or be connected to them, wherein the selected group of Telecom Codes is configured in a database, whereby any digits of Telecom Code in the selected group or any other groups axe any characters permitted by telecom network systems;
   defining a unique format or form of at least one of selected words, phrases, or symbols in a plurality of languages, any multimedia expressions as at least one Content Name, wherein the at least one Content Name is located in any place within the transmitted data, wherein the defined Content Name is configured in the database;
   assigning at least one Content Name to at least one Telecom Code, wherein connection relations and rules of directing between them are characterized as valid and executable on at least one-to-one basis, wherein each of the connection relations and the rules of-directing is configured in the database; and
   utilizing one or more logic structures or computing programs within a computerized system to manage at least one of the Telecom Code, Content Name, connecting/directing function, receiving/analyzing the content transmitted, detecting existence of any specific Content Name, and redirecting the transmitted content to the connected Telecom Codes.

12. The method of claim 11, wherein Telecom Code comprises at least one of a Short Message Service (SMS) Short Code provided by Mobile Telecom Carriers, and Sub Short Code, wherein Short Code are extensions of the SMS Short Code with the SMS Short Codes as the Head Codes and any additional digits of any Arabic numbers up to a maximum of 15 digits as the Sub Code.

13. The method of claim 11, wherein Sub Code or connected Telecom Code comprise at least one of any cell phone number and the same set of Arabic number assigned to other hardware terminals for end user.

14. The method of claim 11, wherein the defined Content Name comprises unique format or unique form of any selected word, phrase or symbol in one or more languages comprising Chinese, English, French, German, Spanish, Japanese, Korean, Thai, Vietnamese; Indian, Turkey, and Arabic.

15. The method of claim 11, wherein assignments of Content Name connecting to Telecom Code comprising at least one of a specific Content Name connecting to Telecom Code, a specific Content Name connecting, to multiple Telecom Codes, and multiple Content Names connecting to a specific Telecom Code.

* * * * *